US012488216B2

(12) United States Patent
Frederick et al.

(10) Patent No.: US 12,488,216 B2
(45) Date of Patent: Dec. 2, 2025

(54) ANTENNA DETECTION USING RFID (71) Applicant: CLAIRVOYANT TECHNOLOGY, INC., Durham, NC (US)

(72) Inventors: Thomas J. Frederick, Chapel Hill, NC (US); Jason Lamb, Wake Forest, NC (US); John Lourigan, Union Grove, WI (US)

(73) Assignee: CLAIRVOYANT TECHNOLOGY, INC., Durham, NC (US)

( * ) Notice: Subject to any disclaimer, the term of this patent is extended or adjusted under 35 U.S.C. 154(b) by 0 days.

(21) Appl. No.: 18/294,076

(22) PCT Filed: Aug. 9, 2022

(86) PCT No.: PCT/US2022/039792
§ 371 (c)(1),
(2) Date: Jan. 31, 2024

(87) PCT Pub. No.: WO2023/018689
PCT Pub. Date: Feb. 16, 2023

(65) Prior Publication Data
US 2024/0338550 A1 Oct. 10, 2024

Related U.S. Application Data

(60) Provisional application No. 63/232,384, filed on Aug. 12, 2021.

(51) Int. Cl.
G06K 7/10 (2006.01)
G06K 19/07 (2006.01)
(Continued)

(52) U.S. Cl.
CPC ... *G06K 19/07775* (2013.01); *G06K 7/10217* (2013.01); *G06K 7/10316* (2013.01);
(Continued)

(58) Field of Classification Search
CPC .......... G06K 7/10217; G06K 7/10356; G06K 19/0723
(Continued)

(56) References Cited

U.S. PATENT DOCUMENTS

2002/0130778 A1  9/2002  Nicholson
2003/0174099 A1  9/2003  Bauer et al.
(Continued)

FOREIGN PATENT DOCUMENTS

EP    3483774 A1    5/2019

OTHER PUBLICATIONS

PCT/US2022/039792, "International Search Report and Written Opinion", Nov. 15, 2022, 18 pages.
(Continued)

*Primary Examiner* — Toan C Ly
(74) *Attorney, Agent, or Firm* — Kilpatrick Townsend & Stockton, LLP (57) ABSTRACT

Aspects and features of this disclosure use an RFID tag or other transponder embedded in an RFID antenna to provide a smart RFID antenna. The smart antenna can have a unique identity, at least in its system environment, and the identity can be readable by the RFID reader through a large insertion loss, providing the reader with the capability to accurately detect the antenna. A method of detecting a smart RFID antenna includes applying a transmit signal at a configured power level, and selectively increasing the configured power level of the transmit signal until detection. In some examples, the process also includes storing location and other useful information for the RFID antenna. In some examples, any or all of this location or other information can be written to a memory in the RFID antenna in addition to a database in the system.

21 Claims, 6 Drawing Sheets

(51) Int. Cl.
   *G06K 19/077* (2006.01)
   *H01Q 1/22* (2006.01)
   *H04B 17/318* (2015.01)

(52) U.S. Cl.
   CPC ....... *G06K 19/0723* (2013.01); *H01Q 1/2216* (2013.01); *H04B 17/318* (2015.01)

(58) Field of Classification Search
   USPC .......................................................... 235/492
   See application file for complete search history.

(56) References Cited

U.S. PATENT DOCUMENTS

| | | |
|---|---|---|
| 2005/0232636 A1 | 10/2005 | Durrant et al. |
| 2008/0068177 A1* | 3/2008 | Copeland ........... G08B 13/2437 340/572.7 |
| 2008/0198017 A1 | 8/2008 | Hesselbarth et al. |
| 2008/0224829 A1 | 9/2008 | Kuramoto |
| 2010/0156651 A1 | 6/2010 | Broer |
| 2010/0259367 A1* | 10/2010 | Kung ................... G06K 7/0095 340/10.3 |
| 2012/0075073 A1 | 3/2012 | Fislage |
| 2012/0286938 A1 | 11/2012 | Cote et al. |
| 2013/0162407 A1 | 6/2013 | Moore |
| 2016/0189021 A1 | 6/2016 | Forster |

OTHER PUBLICATIONS

Application No. EP22856489.4, Extended European Search Report, Mailed On Jul. 14, 2025, 10 pages.

* cited by examiner

ANTENNA DETECTION USING RFID

PRIORITY CLAIM

The present application claims the benefit of U.S. Provisional Application No. 63/232,384 filed Aug. 12, 2021, the full disclosure of which is incorporated herein by reference in its entirety for all purposes.

TECHNICAL FIELD

The present disclosure relates generally to radio frequency identification (RFID) systems. More particularly, though not exclusively, the present disclosure relates to systems that include the capability to detect and inventory connected RFID antennas.

BACKGROUND

RFID systems include, at least, an RFID reader and an antenna. The antenna is used by the reader to transmit interrogation signals to RFID tags and receive responses from the RFID tags. RFID systems can use multiple antennas connected to a reader in order to spread the relatively high cost of the RFID reader electronics over a relatively large servicing area. For systems with multiple antennas, each antenna is connected to the reader through an antenna port. A reader may include multiple built-in antenna ports, or a multiplexer can be used to expand a port into multiple ports to support connection of multiple antennas.

For efficient operation, an RFID reader can be configured with awareness of which ports have antennas connected and which (if any) do not. Such a configuration prevents the reader from transmitting on a port with no antenna connected, which may result in an impedance mismatch, causing delayed antenna switching, overheating, or other undesirable results. Automatic antenna detection to achieve this awareness can be difficult where there is significant insertion loss between the reader's antenna port and the antenna itself, or if the antenna's return loss is high. These characteristics may result from relatively long runs of transmission cable, such as where antennas are spread out over significant area, from the use of multiple multiplexers in the signal path, or both.

SUMMARY

Aspects and features of this disclosure include an RFID antenna. The RFID antenna includes an antenna structure and a transponder or RFID tag couplable to a transmission cable for the RFID antenna. The transponder or RFID tag can provide an RFID reader with information about the RFID antenna. The RFID antenna can be manufactured to include the transponder or RFID tag, or the transponder or RFID tag can be retrofitted to an existing RFID antenna. In some examples, the RFID antenna can include a memory configured to store location and/or other information.

In some examples, a method of detecting an RFID antenna includes applying a transmit signal at a configured power level to a transmission cable communicatively coupled to the RFID reader. The method also includes selectively increasing the configured power level of the transmit signal up to a configured maximum transmit power level or a detection transmit power level. The RFID antenna can be detected at the detection transmit power level. The method also includes selectively identifying the RFID antenna through the transmission cable using an embedded transponder or RFID tag in the RFID antenna based on a backscatter signal from the embedded transponder or RFID tag.

In some examples, the method of detecting the RFID antenna includes storing location information for the RFID antenna in association with an identifier corresponding to the RFID antenna, for example, in an RFID antenna database. In some examples, the method includes storing a return signal strength and a carrier phase of a backscatter signal in association with the identifier corresponding to the RFID antenna. In some examples, any or all of this location, or other information can be written to a memory in the RFID antenna. In some examples, an RFID reader or computer system can transmit or display a tag report including the location information, other information, or both.

In some examples, an RFID reader includes a processor and a non-transitory storage medium associated with the processor. The non-transitory storage medium includes instructions executable by the processor, that when executed cause the processor, perform the one or more of the example methods described above.

DETAILED DESCRIPTION

Certain aspects and features of the present disclosure relate to a system that improves, and makes more efficient, the installation and operation of RFID systems that make use of one or more external RFID antennas. Certain aspects and features relate to an RFID antenna that includes an RFID tag or other RFID transponder to provide an RFID reader with information about the RFID antenna. The information can be used to identify RFID antennas and configure an RFID system using the RFID reader and the antennas.

An RFID system can be configured with awareness of which ports of the RFID reader have antennas connected and which (if any) do not, as well as how the RFID system components are connected and the relative location of the antennas. Automatic antenna detection can be difficult where there is significant insertion loss between the reader's antenna port and the antenna itself, or if the antenna's return loss is high.

Aspects of this disclosure use a transponder or RFID tag embedded in an RFID antenna, which may be referred to herein as a "smart antenna" or "smart RFID antenna." Each smart antenna can have a unique identity, at least in its system environment and the identity is readable by the RFID reader through a large insertion loss, thereby providing the RFID reader with the capability to accurately detect the antenna. If the reader "knows" location information, or other information for the antenna in question, this information can be included in tag reports generated by the reader, or a computing device connected to the reader for administrative purposes. Providing automatically readable identification built into the antennas makes the addition of location information to the system at installation time easy. If additional information such as a model number, serial number, antenna gain, or other signaling characteristics is contained in the antenna's embedded RFID tag, then the RFID reader can ensure that the conducted RF power for the antenna meets regulatory requirements. The RFID reader can use the backscatter signal from the antenna-embedded tag to estimate the insertion loss between the reader and antenna, which is useful both to ensure regulatory compliance and to detect cable faults. If the antenna-embedded RFID tag contains backscatter RSSI calibration information, an accurate insertion loss estimate can be obtained.

In some examples, herein, the use of terms like, "backscatter" or "backscattering" is not intended to imply a radiated signal, as in these examples, the return signal from an RFID tag in an antenna is conducted. In this case the tag modulates its antenna terminal impedance causing the encoded reflection signal to be transmitted back to the RFID reader. Since it is common to use the term "backscatter modulation" to describe far field RFID return signals, this terminology is used even though the reader-to-tag connection being discussed is conducted, not radiated. The examples herein use a passive RFID tag in a smart antenna. In practice, other types of transponders can be used to provide information to the reader.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
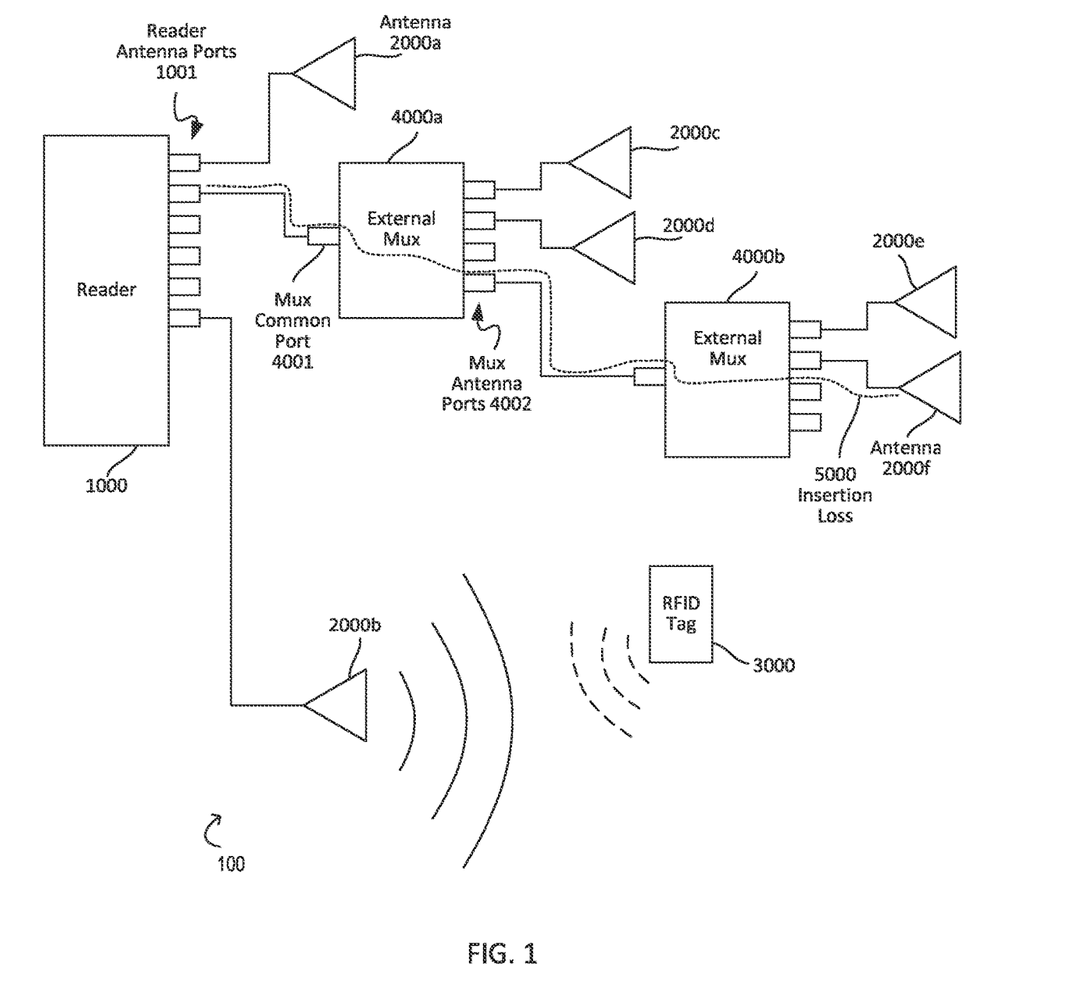
FIG. 1 is a system block diagram showing an example of an RFID system in which a reader according to some aspects of the present disclosure is in use.

FIG. 1 is a block diagram showing an example of an RFID system 100 in which a reader according to some aspects of the present disclosure is in use. System 100 includes an RFID reader with multiple antenna ports, some of which are attached to external antenna hubs and antennas. RFID reader 1000 has one or more antenna ports 1001. Antennas 2000a-f may be connected to reader ports 1001 directly through coaxial cable or another conductive waveguide. The insertion loss to an antenna 2000a-f is the total RF power loss between the reader antenna port 1001 and the antenna 2000a-f. FIG. 1 shows an antenna port 1001 connected to an external antenna multiplexer, or "mux", 4000a. Antenna multiplexers may also be referred to as hubs, external hubs, antenna hubs or antenna port expanders. The reader port is connected to the common antenna port 4001 of the mux 4000a. The mux has multiple output antenna ports 4002. Each of these mux antenna ports may be connected through cable to another mux or an antenna. The antennas are used to communicate over the air with RFID tags such as RFID tag 3000.

Reader 1000 includes an antenna detection algorithm, to be discussed in more detail below with respect to FIG. 3. System 100 can make use of either smart antennas according to aspects of this disclosure, or of antennas without an embedded RFID tag or transponder. The topology shown in FIG. 1 uses antennas without the embedded transponder or RFID tag, and thus presents some difficult challenges to accurately detecting antennas. Specifically, consider the antenna 2000f. The path 5000 between the reader antenna port and antenna 2000f is shown as a dashed line, which is associated with the insertion loss through that path. There are three lengths of coaxial cable; a first length between the reader and mux 4000a; a second length between mux 4000a and mux 4000b; and a third length between mux 4000b and antenna 2000f. Using round numbers for illustrative purposes, if each coaxial cable length results in 2 dB of loss and each mux results in 1 dB of loss, then 8 dB of total insertion loss is present between the reader and the antenna. Since the antenna detection algorithm on the reader 1000 needs to accommodate this 8 dB loss in both directions, the antenna 2000f may be difficult to detect using RF network analysis techniques. Furthermore, antenna multiplexers 4000a-b may be AC-only devices, meaning that the common terminal for antenna port routing and switching inside the mux is not able to pass direct current (DC) through the mux switch. Because of this AC-only path, it is typically not possible to detect antennas using embedded shunt resistance such as might be included when connected through a mux.

Figure 2:
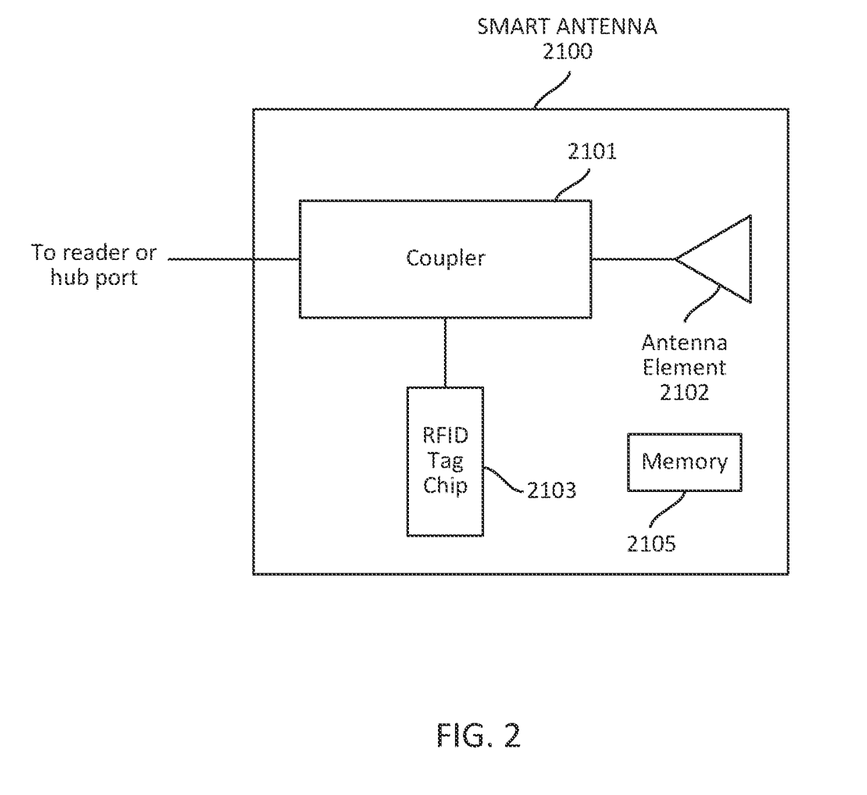
FIG. 2 is a block diagram showing an example of a smart RFID antenna according to some aspects of the present disclosure.

FIG. 2 is a block diagram showing an example of a smart RFID antenna 2100 according to some aspects of the present disclosure. Smart antenna 2100 includes an RFID tag 2103 embedded in the antenna structure and lightly coupled to the conductive antenna feed through coupler 2101. In some examples, the RFID tag sensitivity is on the order of −20 dBm. The RFID chip serves to provide an RFID reader with information about the antenna. As an example, if the coupler 2101 has a 10 dB coupling factor and the reader 1000 produces 30 dBm conducted output power, then the minimum power at the smart antenna coaxial cable port is −10 dBm, so that the embedded tag is readable at −20 dBm. Antenna detection in this example can be accomplished with up to 40 dB of insertion loss between the reader antenna port 1001 and a smart antenna 2100. The smart antenna is reliably detectable with no special circuitry on the reader since the reader 1000 is designed to read RFID tags such as RFID tag 2103.

The coupler 2101 can be engineered in any number of ways, as examples, using discrete couplers, lumped components such and inductors and capacitors, or as part of an antenna printed circuit board structure. The embedded RFID tag can be a discrete semiconductor chip, or it could be printed onto the antenna structure or installed in other ways. The coupler 2101 is connected to the antenna element 2102, which can be any type of antenna including patch, Yagi, helical, etc., as well as including multi-element composite antenna structures. Smart antenna 2100 may also include an antenna memory 2105 configured to store location information and/or other information as described below. Memory 2105 may be an independent memory device built into the antenna or may be a memory integrated into RFID tag 2103.

Figure 3:
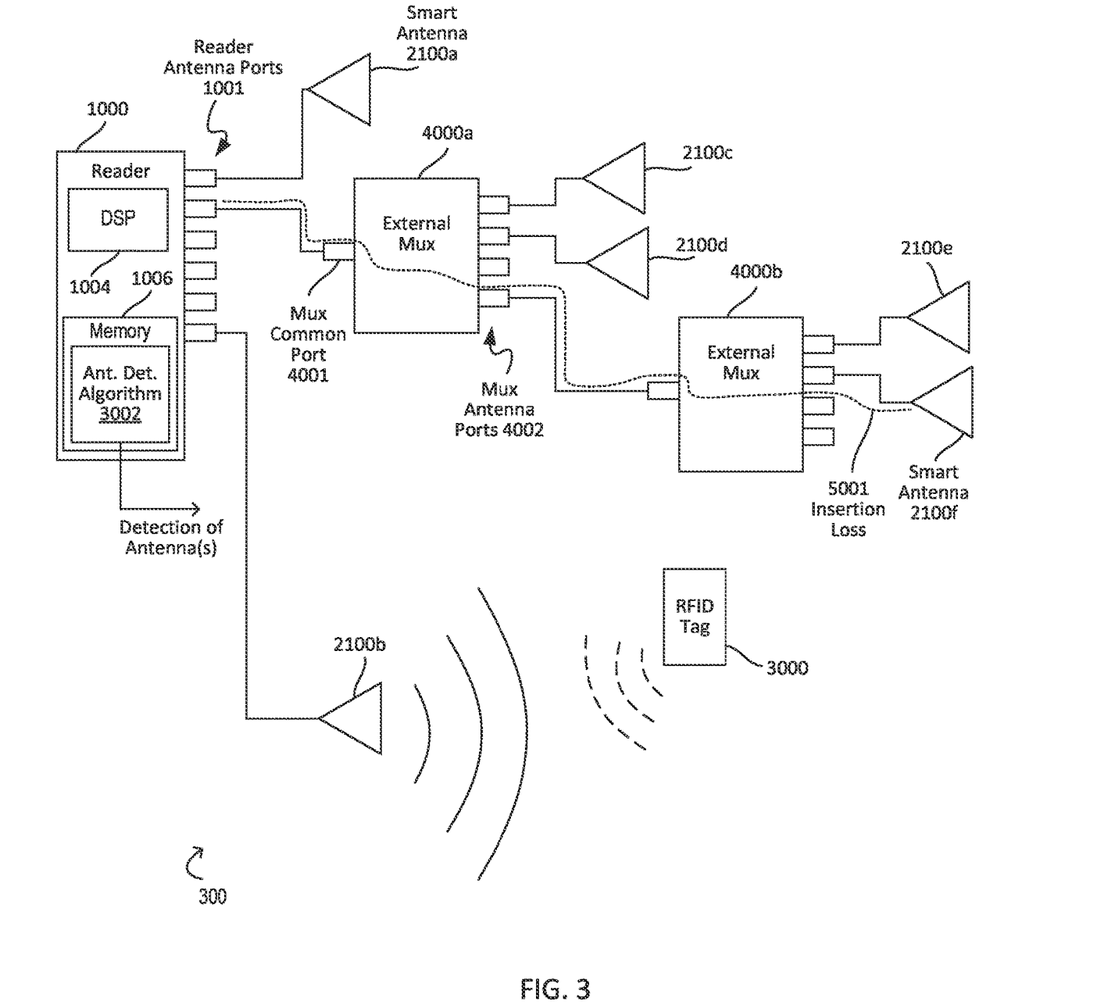
FIG. 3 is a system block diagram showing an example of an RFID system with an RFID reader connected to multiple smart antennas according to additional aspects of the present disclosure.

FIG. 3 is a system block diagram showing an example of an RFID system 300 with the RFID reader 1000 connected to multiple smart antennas 2100a-f according to additional aspects of the present disclosure. RFID reader 1000 includes multiple antenna ports 1001, some of which are attached to external antenna hubs 4000a-b and smart antennas 2100a-f. In this case, antenna 2100f is reliably detected through a path 5001 with significant insertion loss, with no special hardware on the reader 1000 to account for the insertion loss. Detection is accomplished through detection algorithm 3002, which in some examples, implements methods like those discussed below for detecting smart antennas. Detection algorithm 3002 can be accessed by a processor in the reader, in this example, digital signal processor (DSP) 1004. A memory, memory device, or memory devices 1006 in this example serve as a non-transitory storage medium associated with the processor, and the computer program instructions for algorithm 3002 are stored in the memory and are executable by the DSP 1004.

Figure 4:
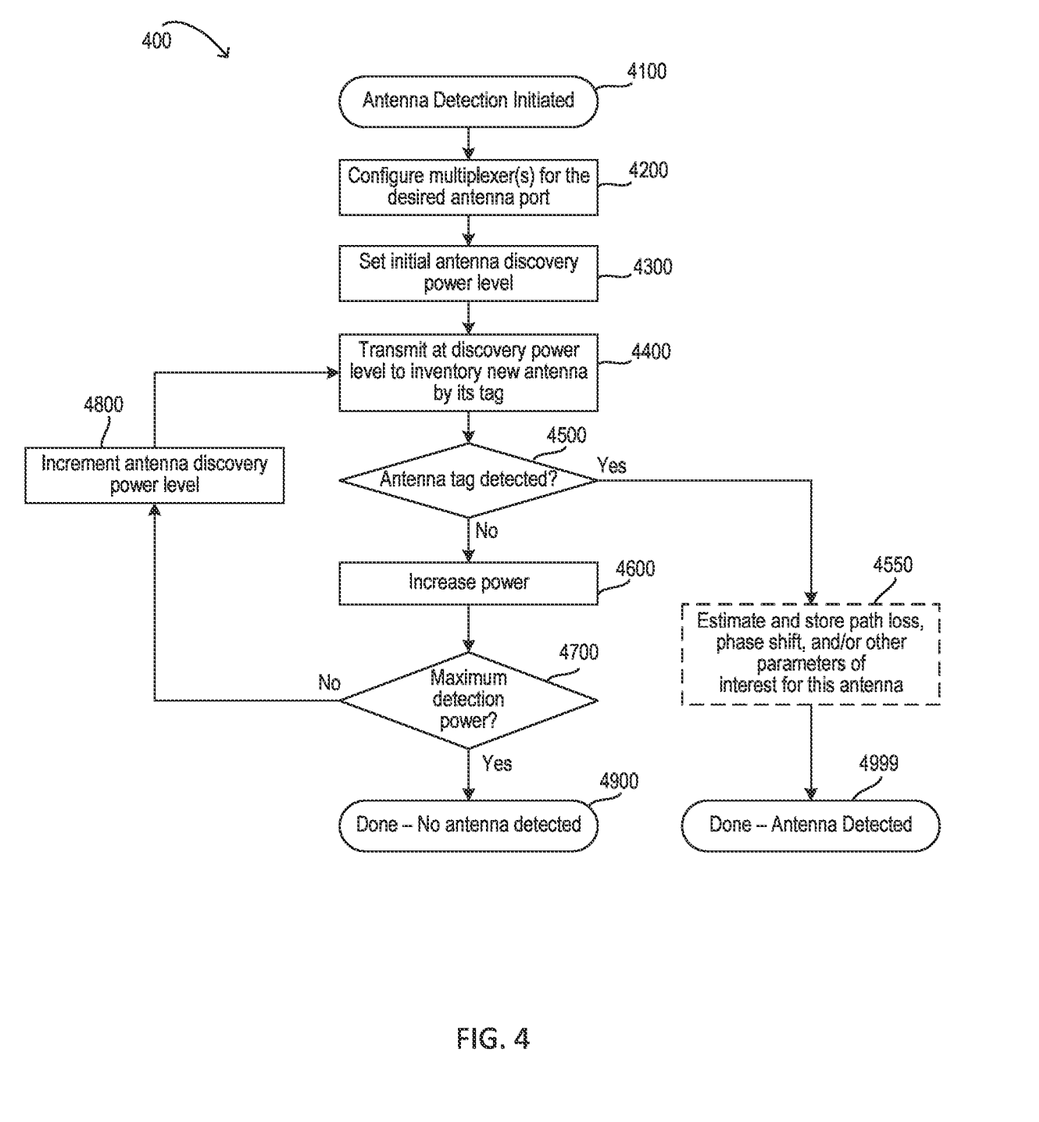
FIG. 4 is a flowchart illustrating a process of an RFID system using smart antennas according to some aspects of the present disclosure.

FIG. 4 is a flowchart illustrating a process 400 of an RFID system using smart antennas according to some aspects of the present disclosure. Process 400 is an antenna detection process for smart RFID antennas in an RFID system using external hubs 4000a-b and smart antennas 2100a-f. At block 4100 the antenna detection process is initiated. For example, the process may be initiated by input from an installer after a smart antenna is connected. At block 4200 the RFID reader 1000 configures its internal and any external multiplexing circuitry to route the radio transmit/receive signal to a specific port. As an example, this routing may be accomplished in response to input from an installer. It may also take place automatically. For example, it could be based on stored system configuration rules regarding antenna connection order. At block 4300 the initial configured transmit power level is set. At block 4400 the process enters a loop, starting with applying a transmit signal at a current configured power level to a transmission cable communicatively coupled to the RFID reader. This transmit signal is used for antenna discovery to read the antenna's tag, which is used to inventory the antenna itself.

At block 4500 of FIG. 4, the reader checks for the smart antenna tag. For example, the reader may be trying to inventory smart antenna 2100 using RFID tag 2103. If the backscatter signal is detected at block 4500, the reader will, optionally at block 4550, measure various aspects of the connection signal for the detected RFID antenna tag, such as the tag's receive signal strength ("RSSI"), the carrier phase of the backscatter signal, or other parameters of interest. Given the known or calibrated RSSI response of the antenna tag, the insertion loss to the antenna can be inferred and can be used to set a power level during operation. In this example, process 400 for the antenna in question ends at block 4999 after successfully detecting the smart antenna. However, the process may be repeated for each antenna, as will be discussed in more detail with respect to FIG. 5.

Still referring to FIG. 4, if at block 4500, the reader does not discover a smart antenna tag, then the process proceeds to block 4600 where the antenna transmit power level is increased. In these examples, the configured power level is from 10 dBm to 20 dBm, and a configured increment for increasing the power is from 0.1 dB to 1 dB. The initial configured transmit power set at block 4300 and the increment value used at 4600 are subject to engineering design tradeoffs. These power levels may be programmed for each installation or fixed and programmatically determined by the antenna detection algorithm code. The power level can start low, for example, 10 dBm, then increment slowly at block 4600, such as in 0.1 dB increments each time detection is attempted. Alternatively, the starting power can be higher, for example, 20 dBm and the increment could be higher, for example, 1 dB at a time. The latter example leads to fewer passes through the power-incrementing loop but gives coarser information about the minimum useful power level for the smart antenna detected. The transmit power level is selectively increased (increased or not) based on the configured power level for the iteration reaching a maximum transmit power level as discussed below, or the detection power level, which is the power level at which the RFID antenna is detected.

At block 4700 in FIG. 4, the transmit power is checked against an upper limit set by the manufacturer of the RFID system components, for example, 30 dBm. If the limit has not been reached at block 4700, the process proceeds to block 4800 where the radio power is increased. The power loop returns to block 4400 to inventory a tag activated to the reader at the current power level. At block 4700, if the maximum detection power has been reached, the process proceeds to block 4900, where the detection process ends without detecting a smart antenna. The antenna is thus selectively identified through the transmission cable using the embedded RFID tag based on whether a backscatter signal is received. A failure to detect the antenna may be reported to an installer or other user, for example, via the reader interface or a display for a computing device being used to configure the RFID system. Process 400 may be repeated or looped through for each antenna installed, as will be discussed in further detail below with respect to FIG. 5.

Figure 5:
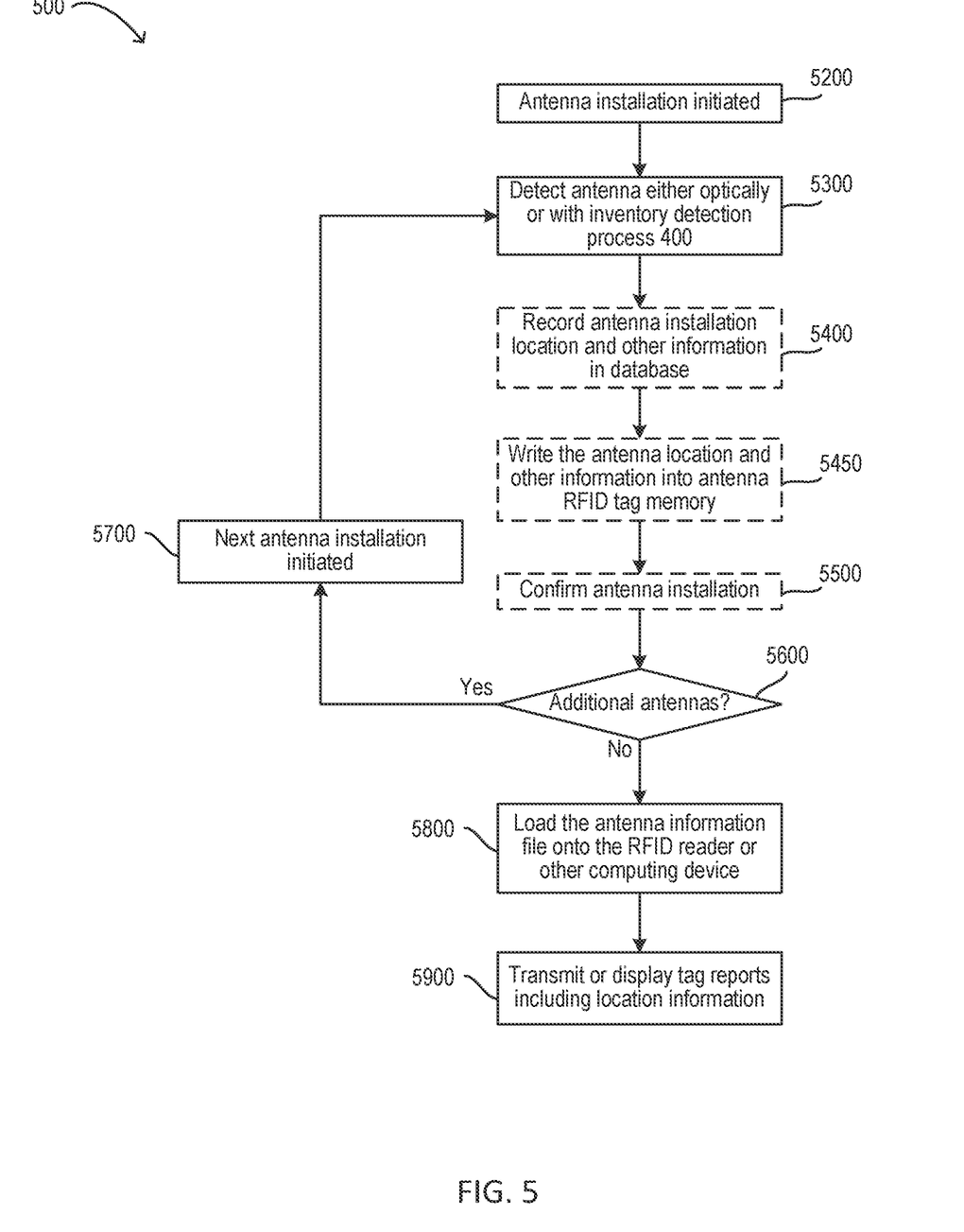
FIG. 5 is a flowchart illustrating an additional example of a process of an RFID system using smart antennas according to some aspects of the present disclosure.

FIG. 5 is a flowchart illustrating an additional example of a process 500 of an RFID system using smart antennas according to some aspects of the present disclosure. Process 500 is for a smart antenna installation process that includes recording and providing the antenna location and other information to the RFID reader as part of the antenna inventory process. The information recording process can be used with either or both of smart antennas as described herein or other RFID antennas.

At block 5200 the antenna installation process begins, possibly with input received at the RFID reader or another computing device. For example, this input may be provided by an installer selecting a first location and antenna for installation. At block 5300 the reader may scan for an embedded RFID tag 2103 using the antenna coaxial cable port and the process as described with respect to FIG. 4. If the antenna is not a smart antenna, the system may, as prompted by an installer, scan a bar code. Alternatively, a barcode that matches the embedded tag identification of a smart antenna may be used to provide information to the RFID reader.

Staying with FIG. 5, at block 5400, the system acquires and records location information for the current antenna and may record other information, such as the signal characteristics previously described. This information is then stored in an RFID antenna database in association with an identifier corresponding to the RFID antenna. The identifier can take any format, for example, the format of a serial number for the antenna. The location can be captured using input based on a location marker in a facility, or made manually, for example by an installer who enters the location information. A location can be a specific geolocation, or a relative location, such as a row and shelf number. The location information can also be captured automatically, for example, if the data entry subsystem has knowledge of an installer's location. Optionally, at block 5450 the RFID reader can write the antenna location information into an antenna memory. Other information, such as the signal characteristics previously discussed, may also be written to the RFID antenna memory. Using this approach, the reader can, if and when needed, obtain information from the antenna RFID tag. This capability can be useful if, for example, the reader is a new replacement, but the antennas and cables remain in place.

At block 5500 in this example, the antenna installation is optionally confirmed. This confirmation may be based on input from the installer and may provide the installer or another user with the opportunity to verify the information that has been gathered. At block 5600, the system determines if additional antennas are to be installed. Again, this determination may be based on installer or user input, which may be provided, for example, based on work order or other documentation. If there are more antennas, the process proceeds to block 5700 where the next antenna is processed as described above, with the process returning to block 5300. Otherwise, at block 5600, if there are no more antennas to install, process 500 proceeds to block 5800, where the accumulated database of antennas and locations can be accessed and loaded into, as examples, the RFID reader, a host computer, an enterprise computer system, or any combination of these. At block 5900, the RFID system in operation can issue tag reports, for example, reports used to manage tagged inventory or discover, for tracking purposes, that a tag has moved. These tag reports may be transmitted to a remote location or displayed on a computing device or the reader. These tag reports can include associated location information for antennas detecting the tags by virtue of the recorded antenna locations. Other information recorded in the database may also be included.

Figure 6:
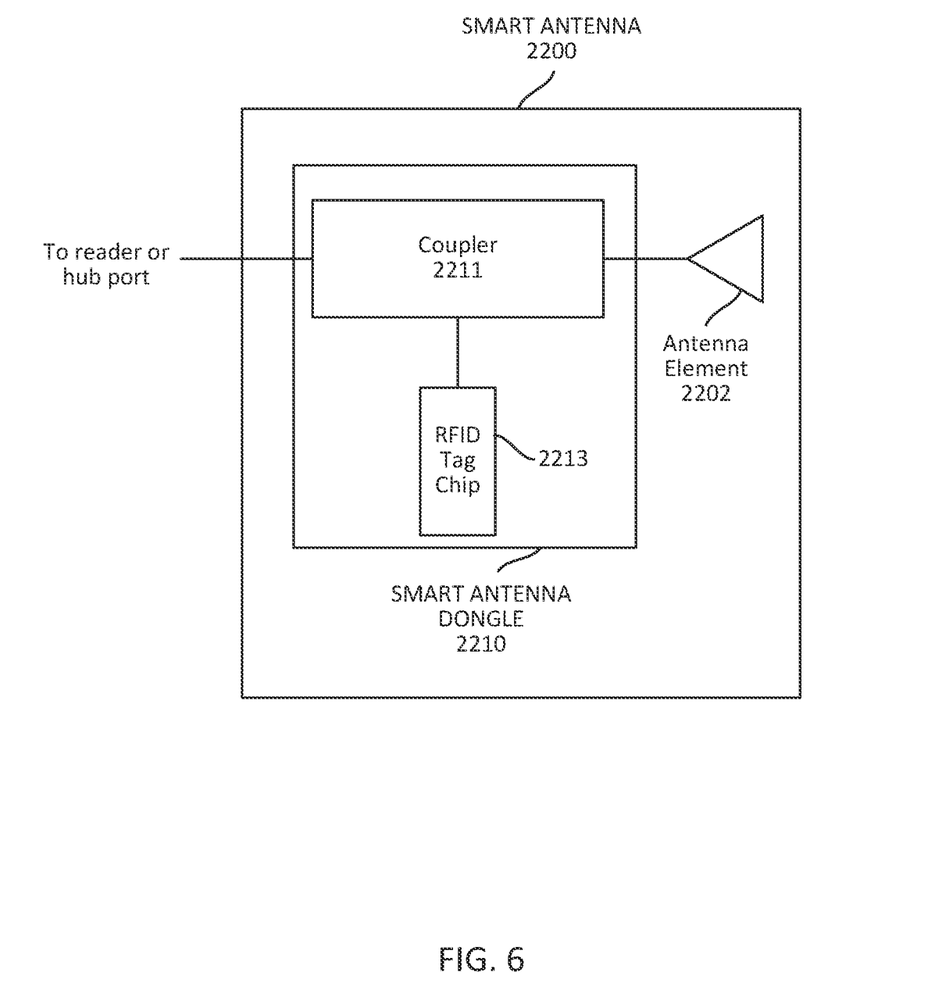
FIG. 6 is a block diagram showing an example of an adapted smart RFID antenna according to some aspects of the present disclosure.

FIG. 6 is a block diagram showing an example of an adapted smart RFID antenna 2200 according to some aspects of the present disclosure. By adapted, what is meant is that an antenna without the RFID tag has been converted to a smart antenna, for example, by use of an adapter or "dongle" containing the RFID tag to retrofit an existing antenna. Smart antenna 2200 includes an antenna element 2202 and a retrofittably attached external smart antenna dongle 2210. The dongle 2210 contains an RFID tag 2213 embedded in the dongle structure and lightly coupled to the main transmission line feed through coupler 2211.

The coupler 2211 in smart antenna 2200 can be engineered in any number of ways, as examples and as previously discussed with reference to FIG. 2, using discrete couplers, lumped components such and inductors and capacitors, or the coupler being part of a small, printed circuit board structure. The embedded RFID tag can be a discrete semiconductor chip, printed onto the antenna structure, or installed in any other way. The mainline coupler's (2211) output is connected to the antenna element 2202 to create a smart antenna. The antenna can be any type of antenna known to those skilled in the art, including patch, Yagi, helical, etc., including multi-element composite antenna structures.

In order to implement the functions of the devices described herein, a general-purpose processor such as a DSP, microcontroller embedded controller, or microprocessor can be used and firmware, software, or microcode can be stored in a tangible or non-transitory storage medium that is associated with a processor. Such a storage medium may be a memory integrated into the processor or may be a memory chip that is addressed by the processor to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RFID device. An RFID device in this context can refer to a reader, a mux, a smart antenna, some other device, or any combination of the foregoing.

The reader described as an example in this disclosure may also be implemented using a discrete component RFID reader design, such as one based on physically separate chips for DACs, ADCs, mixers, amplifiers, couplers, and the like. A processing function for a reader, as well as additional functional bocks or circuits in the reader, can be implemented on a field programmable gate array (FPGA), or on an application specific integrated circuit (ASIC). A reader may also be implemented as a system-on-a-chip (SoC), wherein many of the subsystems are integrated together on a chip. Sometimes multichip SoC solutions can be used to ease manufacturability given the variations in process which may be required based on frequency, power, and the like.

It also be understood that when an element is referred to as being "connected" or "coupled" to another element, it can be directly connected or coupled to the other element or intervening elements may be present. Additionally, numerical ranges, as well as comparative, quantitative terms such as "fewer" or "more", are intended to encompass the concept of equality, thus, "less" can mean not only "fewer" in the strictest mathematical sense, but also, "less than or equal to."

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

The invention claimed is:

1. A radio frequency identification (RFID) antenna comprising:
an antenna structure; and
a transponder or RFID tag installed in or on the antenna structure, the transponder or RFID tag couplable to a transmission cable for the RFID antenna, wherein the RFID antenna is configured to respond to a transmit signal at a detection power level from among selectable power levels to identify the RFID antenna.

2. The RFID antenna of claim 1, wherein the transponder or RFID tag is retrofittably installed in or on the antenna structure.

3. The RFID antenna according to claim 2, further comprising an antenna memory configured to store location information.

4. The RFID antenna according to claim 1, wherein the transponder or RFID tag comprises an RFID chip.

5. The RFID antenna according to claim 1, further comprising an antenna memory configured to store location information, a return signal strength, and a carrier phase.

6. The RFID antenna according to claim 1, wherein the detection power level is selected from among selectively increasing configured power levels.

7. A method of detecting a radio frequency identification (RFID) antenna, the method comprising:
applying a transmit signal at a configured power level to a transmission cable communicatively coupled to an RFID reader;
selectively increasing the configured power level of the transmit signal up to a configured maximum transmit power level or a detection transmit power level at which the RFID antenna is detected; and
selectively identifying the RFID antenna through the transmission cable using an embedded transponder or RFID tag in the RFID antenna based on a backscatter signal from the embedded transponder or RFID tag.

8. The method of claim 7, further comprising:
measuring a return signal strength and a carrier phase of the backscatter signal; and
storing the return signal strength and the carrier phase of the backscatter signal in association with an identifier corresponding to the RFID antenna.

9. The method of claim 8, further comprising:
acquiring location information for the RFID antenna; and
storing the location information in association with the identifier corresponding to the RFID antenna.

10. The method according to claim 7, wherein an initial configured transmit power level is from 10 dBm to 20 dBm, and wherein selectively increasing the configured power level comprises increasing a transmit power level in an increment from 0.1 dB to 1 dB until the RFID antenna is detected or the configured maximum transmit power level is reached.

11. A method according to claim 7, further comprising storing location information for the RFID antenna in association with an identifier corresponding to the RFID antenna in an RFID antenna database.

12. The method of claim 11, further comprising storing a return signal strength and a carrier phase of the backscatter signal in association with the identifier corresponding to the RFID antenna in the RFID antenna database.

13. The method according to claim 12, further comprising writing at least one of the location information, the return signal strength, or the carrier phase to a memory in the RFID antenna.

14. The method of claim 12, further comprising:
accessing the RFID antenna database; and
transmitting or displaying a tag report including at least one of the location information, the return signal strength, or the carrier phase.

15. A radio frequency identification (RFID) reader comprising:
a processor; and
a non-transitory storage medium associated with the processor, the non-transitory storage medium including instructions that are executable by the processor to cause the processor to:
apply a transmit signal at a configured power level to a transmission cable communicatively coupled to the RFID reader;
selectively increase the configured power level of the transmit signal up to a configured maximum transmit power level or a detection transmit power at which an RFID antenna is detected; and
selectively identify the RFID antenna through the transmission cable using an embedded transponder or RFID tag in the RFID antenna based on a backscatter signal from the embedded transponder or RFID tag.

16. The RFID reader of claim 15, wherein the instructions are further executable by the processor to cause the processor to:
measure a return signal strength and a carrier phase of the backscatter signal; and
store the return signal strength and the carrier phase of the backscatter signal in association with an identifier corresponding to the RFID antenna.

17. The RFID reader of claim 16, wherein the instructions are further executable by the processor to cause the processor to:
acquire location information for the RFID antenna; and
store the location information in association with the identifier corresponding to the RFID antenna.

18. The RFID reader according to claim 15, wherein an initial configured transmit power level is from 10 dBm to 20 dBm, and wherein selectively increasing the configured power level comprises increasing a transmit power level in an increment from 0.1 dB to 1 dB until the RFID antenna is detected or the configured maximum transmit power level is reached.

19. The RFID reader according to claim 15, wherein the instructions are further executable by the processor to cause the processor to store location information for the RFID antenna in association with an identifier corresponding to the RFID antenna in an RFID antenna database.

20. The RFID reader according to claim 19, wherein the instructions are further executable by the processor to cause the processor to write the location information to a memory in the RFID antenna.

21. The RFID reader of claim 19, wherein the instructions are further executable by the processor to cause the processor to:
access the RFID antenna database; and
transmit or displaying a tag report including the location information.

* * * * *